(12) United States Patent
Lim et al.

(10) Patent No.: US 12,704,966 B1
(45) Date of Patent: Aug. 11, 2026

(54) MEMORY CONTROLLER WITH SHARED COMMAND BUFFERING FOR ENHANCED PAGE-HIT OPTIMIZATION

(71) Applicant: SKYECHIP BERHAD, Bayan Lepas (MY)

(72) Inventors: Soon Chieh Lim, Bayan Lepas (MY); Jing Ye Teh, Bayan Lepas (MY); Brendan Zhi Cheng Wong, Bayan Lepas (MY)

(73) Assignee: SKYECHIP BERHAD, Bayan Lepas (MY)

( * ) Notice: Subject to any disclaimer, the term of this patent is extended or adjusted under 35 U.S.C. 154(b) by 0 days.

(21) Appl. No.: 19/174,133

(22) Filed: Apr. 9, 2025

(30) Foreign Application Priority Data

Mar. 4, 2025 (MY) ............................ PI2025001435

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC .... G06F 3/0613; G06F 3/0659; G06F 3/0673; G06F 12/00; G06F 12/02; G06F 13/16; G06F 13/1673; G06F 13/1684; G11C 7/10; G11C 8/10; G11C 11/00
See application file for complete search history.

(56) References Cited

U.S. PATENT DOCUMENTS 5,638,534 A * 6/1997 Mote, Jr. ............. G06F 12/0215 711/158
6,683,816 B2 * 1/2004 Emmot .................... G11C 8/12 365/230.06
10,209,925 B2 2/2019 Katayama
10,664,407 B2 5/2020 Gupta et al.
2024/0370387 A1 * 11/2024 Magro ................ G06F 12/0246

* cited by examiner

*Primary Examiner* — Tracy C Chan
(74) *Attorney, Agent, or Firm* — Jayne Saydah

(57) ABSTRACT

A command buffer for a memory controller comprises a plurality of entries or storing a plurality of commands sequentially, characterized in that each entry includes a main command field, a plurality of shared command fields; a load pointer configured to indicate a next available shared command field for loading a new command targeting the same page; and a pop pointer configured to indicate a next shared command field in which the command is to be moved to the main command field after the command is removed. The method of operating a memory controller is also disclosed herein.

10 Claims, 6 Drawing Sheets

10
B-HOL
P-TOL
P-HOL
A1
VALID
SHARED
20
11
12
12
12

100
12
12
11
11
B-HOL
P-TOL
P-HOL
B2
VALID
SHARED
A1
A3
A4
30
B5
20

MEMORY CONTROLLER WITH SHARED COMMAND BUFFERING FOR ENHANCED PAGE-HIT OPTIMIZATION

This is a Non-Provisional Application which claims priority to Malaysian Application No. PI2025001434 filed Mar. 4, 2025. The disclosure of the prior application is hereby incorporated by reference herein in its entirety.

TECHNICAL FIELD

The present invention pertains to the field of memory controller systems, and more particularly to a command buffer sharing mechanism for memory controllers.

BACKGROUND ART

Memory controllers are essential components in modern computing systems, responsible for managing the flow of data between the processor and memory. Efficient memory access is critical for overall system performance. However, traditional buffers in memory controllers often have limitations in terms of depth, leading to suboptimal command scheduling and increased latency. These limitations can occur when the controller cannot maintain a sufficient lookahead of upcoming memory accesses, resulting in inefficient page switching and increased overhead.

Below are several examples of prior arts related to the command buffer for a memory controller.

United States of America patent publication no. U.S. Ser. No. 10/209,925B2 discloses a memory controller is provided for accessing shared memory objects by read and write requests made to a memory. The memory controller includes a list for registering address locations of the shared objects in the memory and having slots for a lock bit. The memory controller includes a read wait queue, and a write wait queue for selectively inputting, outputting, holding, and purging requests. The memory controller includes a read initiated queue and a write-initiated queue for selectively inputting and purging requests transferred from the read wait queue and the write wait queue, respectively, upon memory access initiation and completion. The memory controller includes a controller for controlling the wait queues using policies by determining which requests to output, hold, and purge, based on a list entry, a lock bit and TTL information set to each request upon a hold being applied thereto and decremented in each cycle Another United States of America patent publication no. U.S. Ser. No. 10/664,407B2 disclosed a set of data entries is transferred via a memory mapped interface from an external peripheral device to a processor device and is stored in a shared memory region. Based on a first pointer to the shared memory region, a first process executed by the processor device processes a first group of the data entries. Based on a second pointer to the shared memory region, a second process executed by the processor device processes a second group of the data entries. The second process indicates the second pointer to the first process. The first process indicates a lower one of the first pointer and the second pointer to the peripheral device.

It is evident that the existing memory controller systems lack features to efficiently handle and optimize the processing of multiple sequential commands targeting the same memory controller page.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to optimize handling of sequential commands targeting the same memory page.

It is also an objective of the present invention to provide a mechanism for grouping and processing sequential commands within a single command buffer entry.

Accordingly, these objectives may be achieved by following the teachings of the present invention. The present invention proposes a command buffer for a memory controller, comprising: a plurality of entries for storing a plurality of commands sequentially, characterized in that each entry comprise: a main command field, a plurality of shared command fields, wherein the main command field and the plurality of shared command fields of each entry are configured to store the commands targeting the same page, defined as having the same row and bank addresses and differing only in the least significant bits of the column address; a load pointer configured to indicate a next available shared command field for loading a new command targeting the same page; and a pop pointer configured to indicate a next shared command field in which the command is to be moved to the main command field after the command is removed.

Moreover, the present invention propose a method of operating a memory controller comprising the steps of: receiving a plurality of commands in a plurality of entries of a command buffer, each entry comprises: a main command field, a plurality of shared command fields, a load pointer indicating a next available shared command field for loading a new command field targeting the same page, and a pop pointer configured to indicate a next shared command field in which the command is to be moved to the main command field; identifying commands targeting the same page as the command in the main command field, defined as having the same row and bank addresses and differing only in the least significant bits of the column address; loading the identified commands targeting the same page into the shared command fields according to the load pointer; incrementing the load pointer by 1, upon loading the shared command field to indicate a subsequent shared command field for loading the command; removing the command which has been processed from the main command field; moving the command from the shared command field as indicated by the pop pointer into the main command field; and incrementing the pop pointer by 1, upon moving the command from the shared command field to indicate subsequent shared command field for moving the command into the main command field.

The foregoing and other objects, features, aspects, and advantages of the present invention will become better understood from a careful reading of a detailed description provided herein below with appropriate reference to the accompanying drawings.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figures, with like reference numbers referring to like structures across the views, wherein.

DETAILED DESCRIPTION OF THE INVENTION

Figure 1:
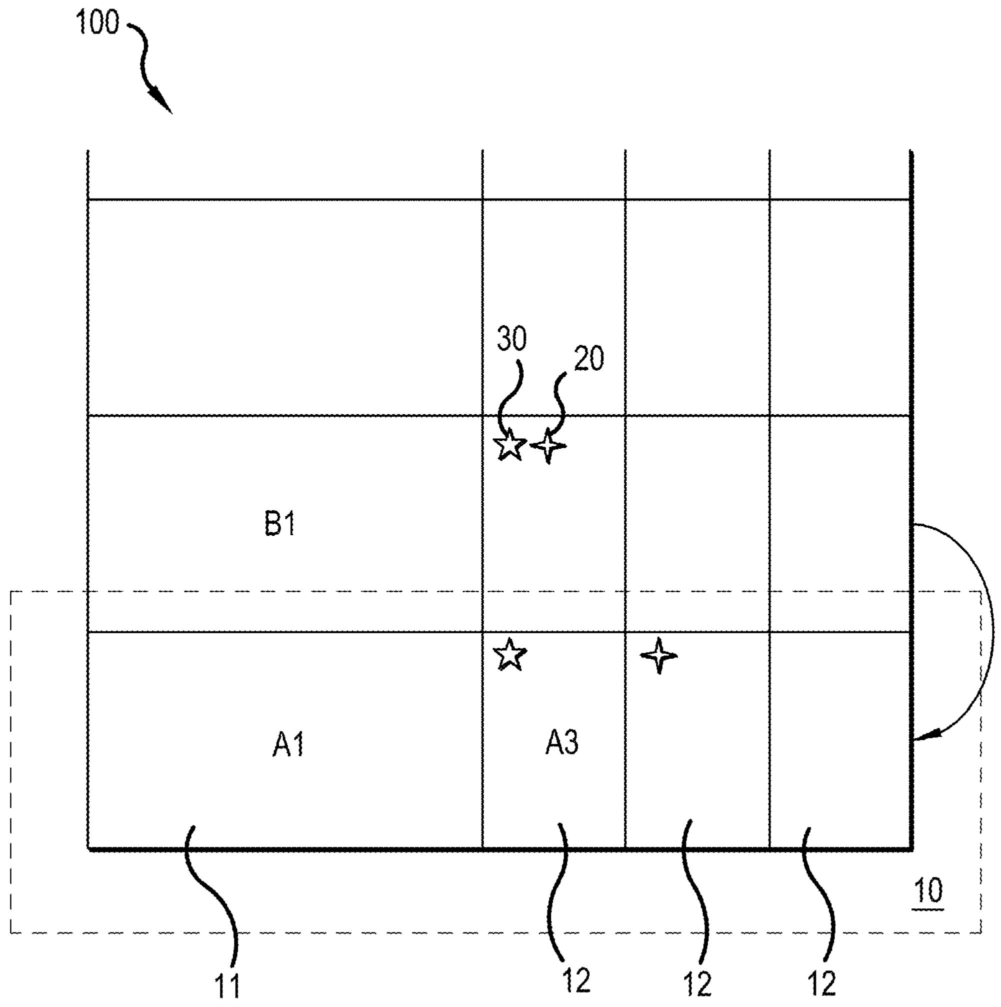
FIG. 1 illustrates a command buffer comprising a plurality of entries for storing a plurality of commands sequentially in accordance with an embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

The present invention proposes a command buffer (100) for a memory controller, comprising: a plurality of entries (10) for storing a plurality of commands sequentially, characterized in that each entry (10) comprise: a main command field (11), a plurality of shared command fields (12), wherein the main command field (10) and the plurality of shared command fields (12) of each entry (10) are configured to store the commands targeting the same page, defined as having the same row and bank addresses and differing only in the least significant bits of the column address; a load pointer (20) configured to indicate a next available shared command field (12) for loading a new command targeting the same page; and a pop pointer (30) configured to indicate a next shared command field (12) in which the command is to be moved to the main command field (11) after the command is removed.

In accordance with an embodiment of the present invention, each entry (10) further comprises a validity bit for indicating validity of the commands in the entry (10). This validity bit serves as a flag to efficiently track the status of each command within the shared entry. When a command is successfully loaded into the shared command field (12), its corresponding validity bit is set to "valid".

Conversely, when a command is processed and removed from the entry (10), its validity bit is cleared.

In accordance with an embodiment of the present invention, each entry (10) is configured to store two or four commands. Each entry of the memory buffer can have one main command field (11) with one or three shared command fields (12). By allowing multiple commands to be stored within a single entry, the command buffer can effectively increase its depth without requiring a significant increase in hardware resources. For instance, a four-commands can quadruple the command buffer's depth, allowing the memory controller to maintain a larger lookahead of upcoming memory accesses.

In accordance with an embodiment of the present invention, the load pointer (20) is incremented by 1 when a new command is stored in the shared command field of the entry (10). The load pointer (20) manages the allocation of shared command fields (12) within an entry. By incrementing the load pointer by 1 whenever the new command is stored in the shared command field (12), the memory controller ensures that subsequent shared commands are loaded into the appropriate available slots. This prevents overwriting existing commands and maintains the correct order of shared commands within an entry. The load pointer (12) essentially acts as an index, tracking the next available location for storing a new shared command.

In accordance with an embodiment of the present invention, the pop pointer (30) is incremented by 1 when the command in the main command field (11) is removed. The pop pointer (30) is for maintaining the correct order of command execution within the shared command field (12). When the main command is processed and removed from the main command field (11), the pop pointer (30) is incremented by 1. This action signals that the next shared command in the sequence in the shared command field (12) with the slot as indicated by the pop pointer (30), should be moved to the main command field (11) for subsequent processing.

In accordance with an embodiment of the present invention, the load pointer (20) and the pop pointer (30) are configured to indicate a first slot of the shared command fields (12) when the command targeting a new page is loaded into the main command field (11), or all the commands in shared command fields (12) are removed. Firstly, when a command targeting a new DRAM page is loaded into the main field (11), the load pointer (20) and the pop pointer (30) are reset. By resetting the pointers (20, 30) the entry (10) is cleared and prepared to accommodate a new set of shared commands associated with the newly loaded main command. Secondly, the load pointer (20) and the pop pointer (30) are also reset when all commands in the shared command fields (12) have been processed. This condition indicates that the entry (10) is not empty and ready to accommodate a new set of shared commands for the current main command or a subsequent main command targeting the same page.

Furthermore, the present invention proposes a method of operating a memory controller comprising the steps of: receiving a plurality of commands in a plurality of entries (10) of a command buffer, each entry (10) comprises: a main command field (11), a plurality of shared command fields (12), a load pointer (20) indicating a next available shared command field (12) for loading a new command field targeting the same page, and a pop pointer (30) configured to indicate a next shared command field (12) in which the command is to be moved to the main command field (11); identifying commands targeting the same page as the command in the main command (11) field, defined as having the same row and bank addresses and differing only in the least significant bits of the column address; loading the identified commands targeting the same page into the shared command fields (12) according to the load pointer (20); incrementing the load pointer (20) by 1, upon loading the shared command field (12) to indicate a subsequent shared command field (12) for loading the command; removing the command which has been processed from the main command field (11); moving the command from the shared command field (12) as indicated by the pop pointer (30) into the main command field (11); and incrementing the pop pointer (30) by 1, upon moving the command from the shared command field (12) to indicate subsequent shared command field (12) for moving the command into the main command field (11).

In accordance with an embodiment of the present invention, merging the commands into a single command is disallowed for entries containing shared commands. This restriction is implemented to prevent potential disruptions to the intended order of command execution within the entry (10). Write merging is a technique where multiple write commands targeting the same memory address are combined into a single command to improve efficiency. However, when applied to entries containing shared commands, write merging can introduce unpredictable behavior. Merging a write command with the main command in an entry (10) that also contains shared commands could inadvertently alter the intended sequence of operations and potentially lead to incorrect data writes or unexpected behavior. By disallowing write merging for entries (10) containing shared commands, the present invention ensures that the integrity of the command sequence is maintained and that commands are executed in the correct order as intended. This restriction contributes to the stability and reliability of the memory controller operation.

In accordance with an embodiment of the present invention, further comprising a mechanism for blocking read commands from loading into the main command field (11) when a write command to the same address, defines as having the same row and bank addresses, is pending in the main command field (11). When a write command is pending in the main command field (11), it indicates that data is being written to a specific memory location. If a read command to the same memory address, identified by matching row and bank addresses, is allowed to proceed concurrently, it may attempt to read data before the write operation is completed. This can result in reading stale or incorrect data, leading to data integrity issues. By blocking read commands to the same address while a write command is pending, the memory controller ensures that read operations only occur after the write operation is completed and the data has been successfully written to the memory. This mechanism guarantees data consistency and prevents potential data corruption, enhancing the reliability and accuracy of memory operations.

In accordance with an embodiment of the present invention, the blocking mechanism is deactivated when all write commands to said address, defines as having the same row and bank addresses have been processed and removed from the main command field (11). Once all write commands to the specific address, identified by matching row and bank addresses, have been successfully processed and removed from the main command field (11), the blocking mechanism is deactivated. This allows subsequent read commands to the same address to proceed, ensuring efficient memory access and preventing unnecessary delays in read operations. By dynamically deactivating the blocking mechanism based on the completion of pending write operations, the memory controller optimizes its operation, preventing unnecessary delays while maintaining data consistency and ensuring the integrity of memory access operations.

Figure 2:
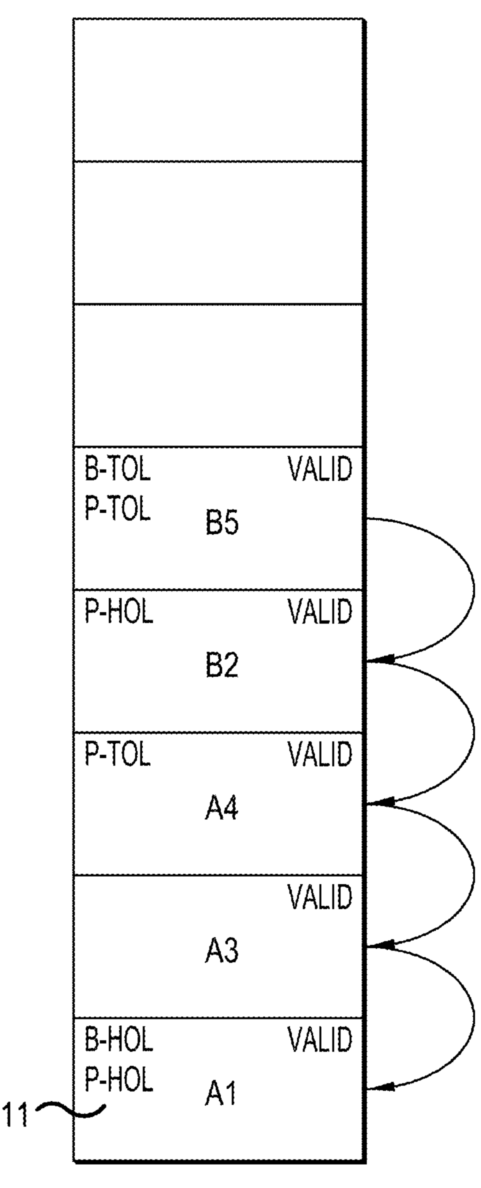
FIG. 2 shows a conventional command buffer with 5 commands loaded into it.

Referring to FIGS. 1 and 2, the present invention will now be described in more detail.

FIG. 1 illustrates a command buffer (100) for a memory controller. The command buffer (100) comprises a plurality of entries (10), each of which is capable of storing a plurality of commands sequentially. Each entry (10) includes a main command field (11) and a plurality of shared command fields (12). The main command field (11) and the shared command field (12) within an entry (10) are designed to store commands that target the same DRAM page, especially those having the same row and bank addresses while differing only in the least significant bits of the column address. Furthermore, each entry (10) incorporates a load pointer (20) that indicates the next available shared command field (12) for loading a new command, and a pop pointer (30) that signifies the next shared command field (12) from which the command should be moved to the main command field (11) after the current main command has been processed.

Moreover, FIG. 2 illustrates a conventional buffer structure within a memory controller. The buffer contains 8 available entries with 5 commands loaded into it. A command buffer serves as a storage and ordering mechanism for a series of commands, such as read and write operations. These commands are typically organized within a linked list structure, where each entry in the list represents a single command field (11). Each entry in the linked list carries a set of attributes as shown Table 1 below, including information such as the target address, dependencies on other commands, and indicator for the head and tail of linked associated with specific pages or bank.

TABLE 1

| Attributes | Description |
|---|---|
| Valid | Indicates whether the entry is a valid entry |
| P-HOL | Head of page linked list |
| P-TOL | Tail of page linked list |
| B-HOL | Head of bank linked list |
| B-TOL | Tail of bank linked list |
| Dependency index | Indicates which entry in the linked list that this entry is linked to |
| Address | Write/Read command address (Row, Column, Bank, etc.) |

Furthermore, FIG. 2 also depicts an example of a populated command buffer with five commands of A1, B2, A3, A4 and B5 loaded in it. Commands targeting the same page are grouped together within the linked list to minimize page turnaround overheard and improve overall memory access efficiency. The size and depth of the command buffer significantly impact the memory controller's performance. While a deeper buffer allows for better command scheduling and potentially improved performance, it also comes at the cost of increased hardware resources and potentially larger logic cones for the scheduler, impacting overall system timing.

Hereinafter, examples of the present invention will be provided for more detailed explanation by referring to FIGS. 3 to 8. These examples aim to illustrates the key principles and advantages of the present invention that may be more readily understood and put into practical effect from these examples. However, it is to be understood that the following examples are not intended to limit the scope of the present invention in any ways.

EXAMPLES

Example 1: Two-Deep Command Buffer Sharing

Figure 3:
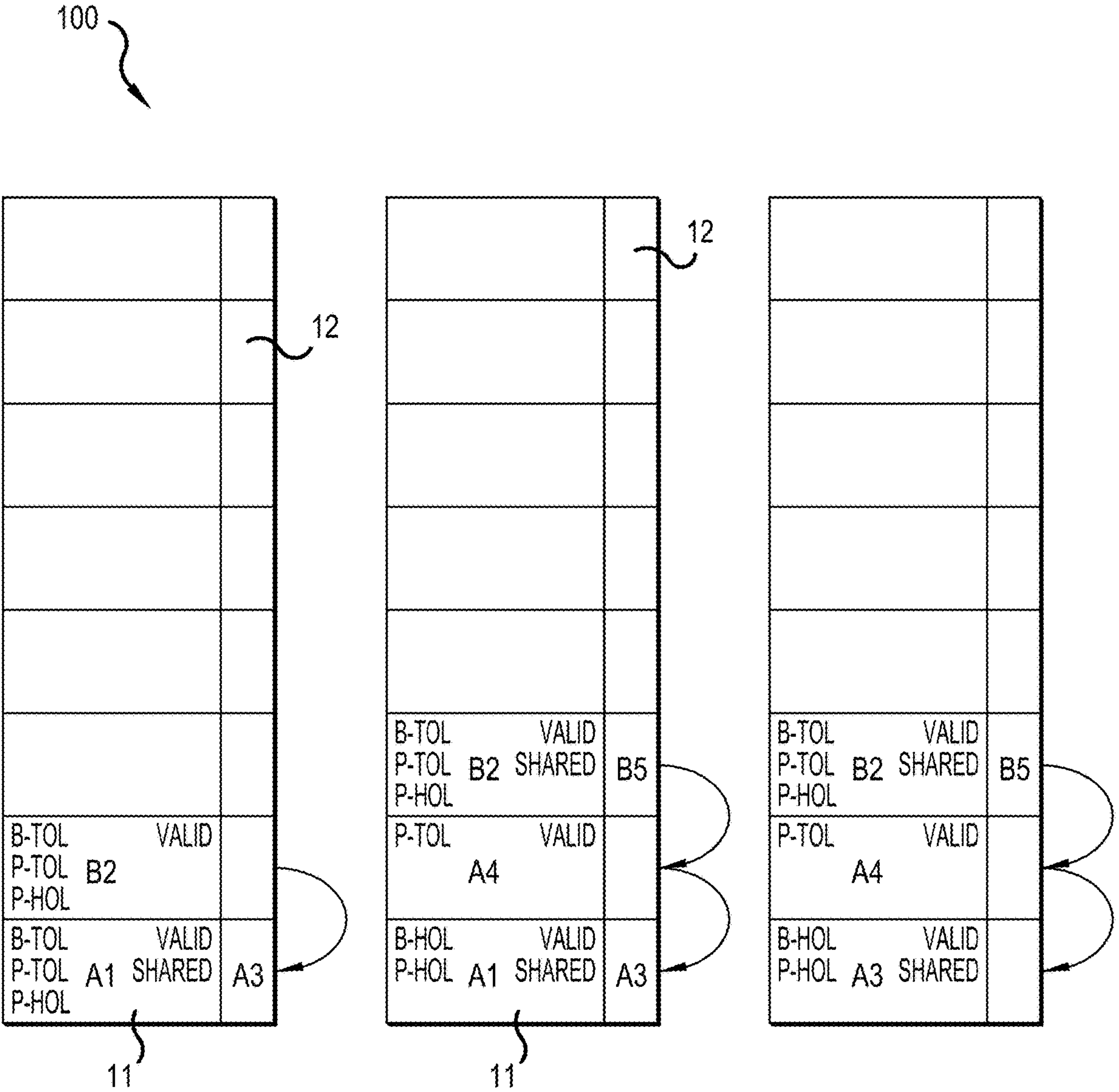
FIG. 3 illustrates a 2-deep command buffer sharing mechanism in accordance with an embodiment of the present invention.

FIG. 3 illustrates the concept of 2-deep command buffer sharing. In this scenario the command buffer (100) is designed to store and process multiple sequential commands that target the same DRAM page. To demonstrate this, FIG. 3 shows the following sequence commands of A1, B2, A3, A4, and B5. A1, A3 and A4 are sequential commands for page A, and B2 and B5 are sequential commands for page B, the command buffer (100) would typically require separate entries (10) to store these commands.

However, with 2-deep command buffer sharing, the system can optimize this. A1 and B2 are initially loaded into individual entries (10) as usual. When command A3 arrives, which is sequential to A1 and targets the same page, it is not assigned a separate entry. Instead, A3 is "shared" within the same entry (10) as A1. Similarly, A4, being sequential to A1 and A3, is also shared within the same entry (10).

The next command, B5, which is sequential to B2, is similarly shared within the same entry (10) as B2. This approach reduces the number of required entries (10) from five to three, significantly improving the utilization of the command buffer (100).

When the main command A1 is processed and removed from the main command field (11), the secondary command (A3) automatically exit from the shared command fields (12) and loads it into the main command field (11) for subsequent processing.

Example 2: Four-Deep Command Buffer Sharing and the Usage of Pointers

Figures 4, 5:
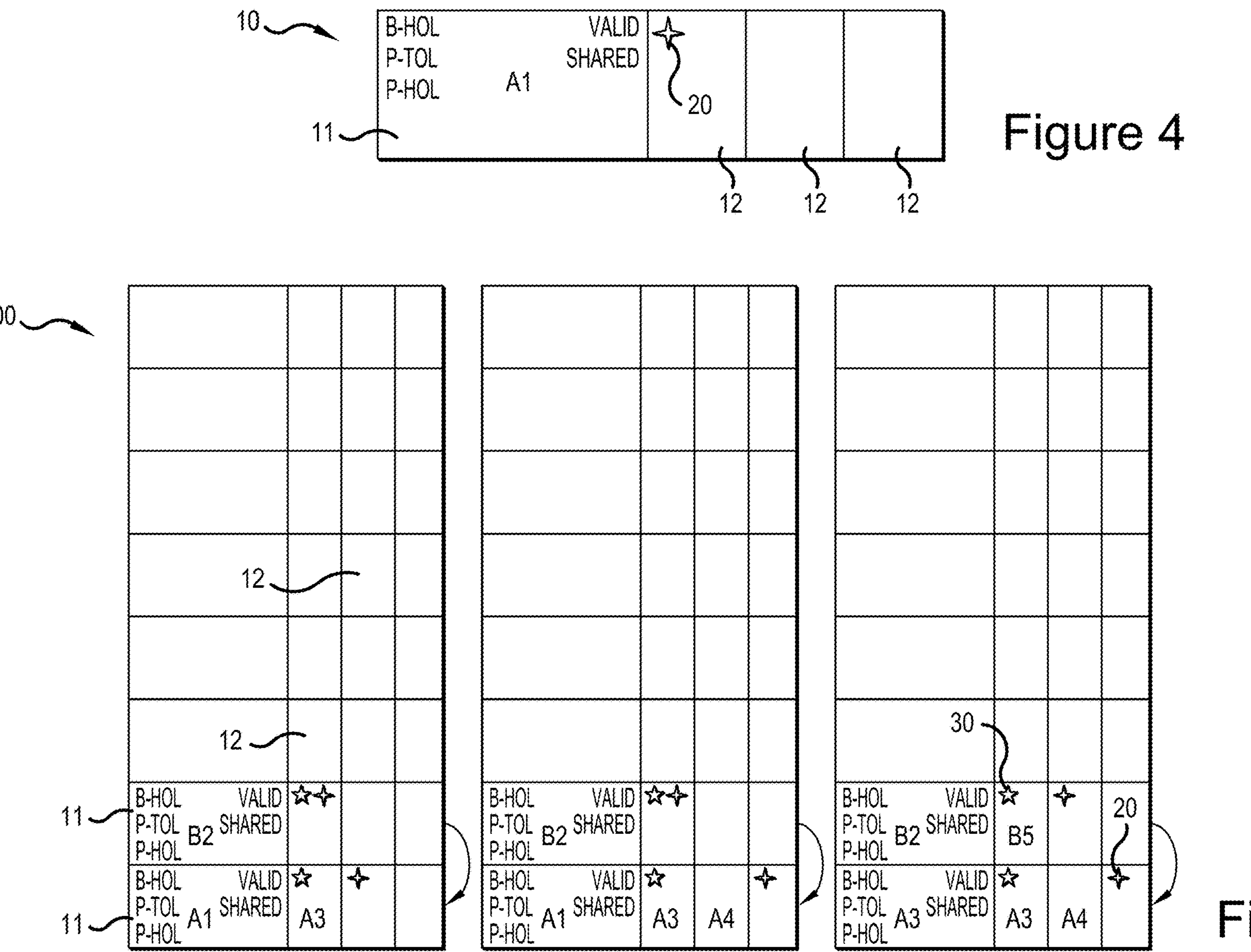
FIG. 4 shows a 4-deep entry for sharing a buffer entry in accordance with an embodiment of the present invention.
FIG. 5 illustrates the usage of the load pointer and the pop pointer in the 4-deep command buffer sharing mechanism for loading and unloading sharing command in accordance with an embodiment of the present invention.

FIG. 4 illustrates the operation of the load pointer (20) within the 4-deep command buffer sharing mechanism. The load pointer (20) manages the allocation of shared command field (12) within a single entry (10). Initially, when a new main command is loaded into the entry (10), the load pointer (20) is set to 0 (first shared command field). As subsequent commands that satisfy the 4-deep sharing criteria i.e., commands targeting the same page and differing only in the least significant two bits of the column address, are loaded into the entry (10), then the load pointer (20) is incremented by 1. This mechanism tracks the next available slot within the shared command fields (12) for accommodating new shared documents.

Next, the practical example of load pointer (20) usage is demonstrated in FIG. 5. In this scenario, commands A1, A3, and A4, all targeting the same page with slight variations in the column address, are sequentially loaded into the same entry (10). As each shared command is loaded, the load pointer (20) in incremented, indicating the next available slot of the shared command field (12) within the entry (10). This ensures that new shared commands are correctly allocated within the available space, maintaining the integrity of the shared command sequences.

Figure 6:
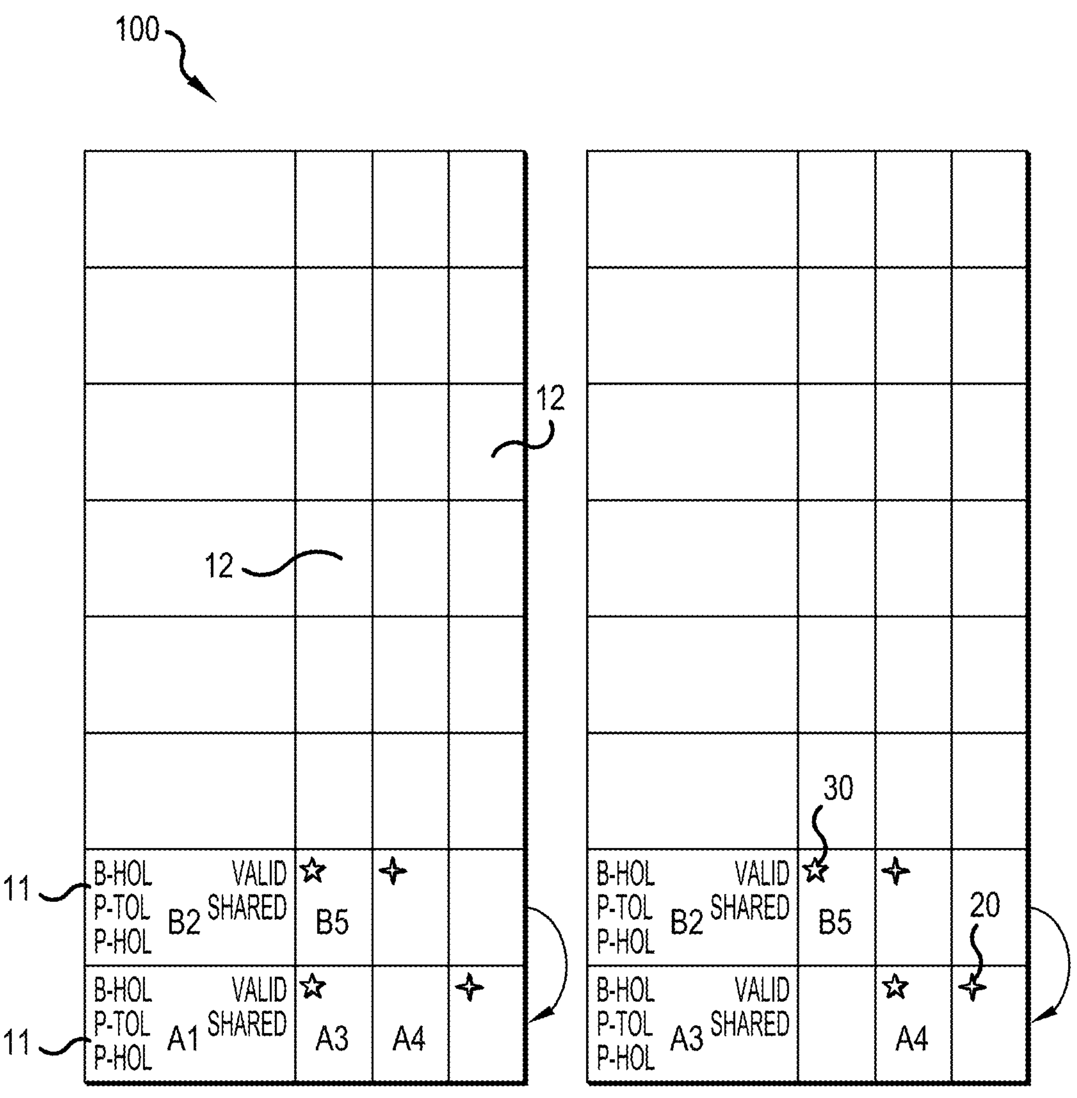
FIG. 6 illustrates the usage of the pop pointer in the 4-deep command buffer sharing mechanism when command is unloaded from main entry in accordance with an embodiment of the present invention.

Moreover, FIG. 6 highlights the role of the pop pointer (30) in managing the removal processed commands from the shared command fields (12). The pop pointer (30) tracks the order in which shared command should be moved to the main command field (11) for execution. When the main command is processed and removed, the pop pointer (30) is incremented by 1, indicating the next shared command to be moved to the main command field (11). This ensures that commands are processed in the correct order, maintaining the intended sequence of operations.

Furthermore, the pop pointer (30) is also used for efficient entry (10) management. When all shared commands within an entry (10) have been processed, the pop pointer (30) is reset to its initial value (0), indicating that the entry (10) is now available for accommodating a new set of shared commands associated with the next main command. This dynamic reset mechanism ensures optimal utilization of the shared command fields (12) and prevents potential conflicts or errors in subsequent command processing.

The combination of the load pointer (20) and pop pointer (30) forms a robust dual-pointer system that enables efficient management of the shared commands within each entry (10). This system ensures that commands are loaded correctly, processed in the intended order, and that the shared command field (12) is effectively utilized, leading to significant improvements in memory access efficiency and overall system performance.

Example 3: Handling Special Conditions—Write Merging

Write merging is an optimization technique where multiple write commands targeting the same memory address are combined into a single write command. This reduces the number of individuals write operations, improving overall access efficiency. However, when dealing with shared entries in the command buffer (100), special consideration are necessary to ensure the correct order of execution.

Figure 7:
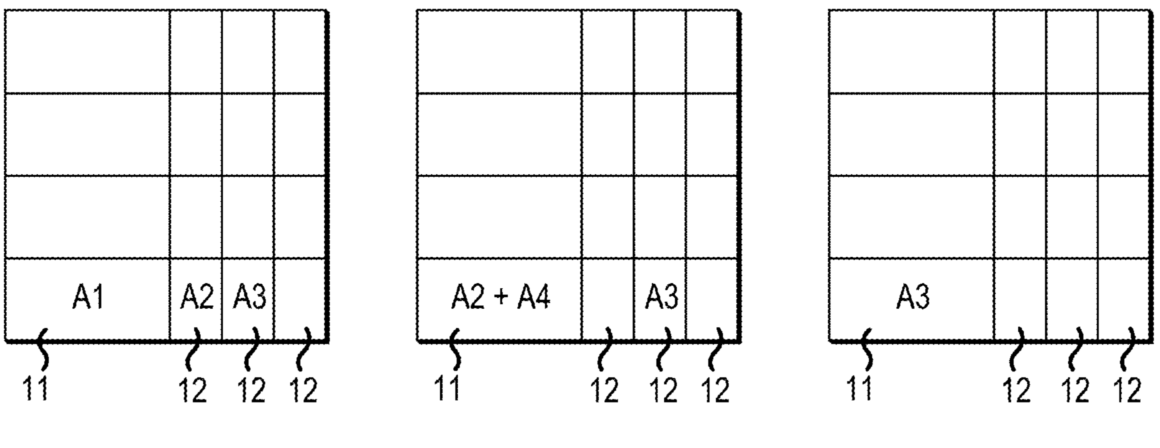
FIG. 7 shows an incorrect behavior for write merging scenario in accordance with an embodiment of the present invention.

The primary challenge arises from the fact that write merging typically occurs with the main command within the entry (10). When the entry (10) contains shared commands, merging with only the main command can lead to incorrect command ordering. FIG. 7 illustrates a scenario where this issue occurs. A sequence of write commands (A1, A2, A3, A4) are loaded into the command buffer (100). A1 is the main command, while A2, and A3 are shared commands within the same entry (10). When A1 is processed and removed, A2 becomes the main command. If A4 is then merged with A2 (the current main command), it can disrupt the intended order of execution, as A3, which was previously a shared command, should be processed before A4.

To overcome this, the system may modify the write merging logic to consider all commands within an entry, including shared commands. The merging operation should then be performed with the most recently loaded command within the entry (10). Another and more preferable solution is disallowing write merging altogether for entries that contain shared commands. This approach simplifies the logic and avoid potential complications. Since multiple writings to the same address are generally less common, the performance impact of this restriction may be minimal.

Example 4: Handling Special Conditions—Command Blocking

Figure 8:
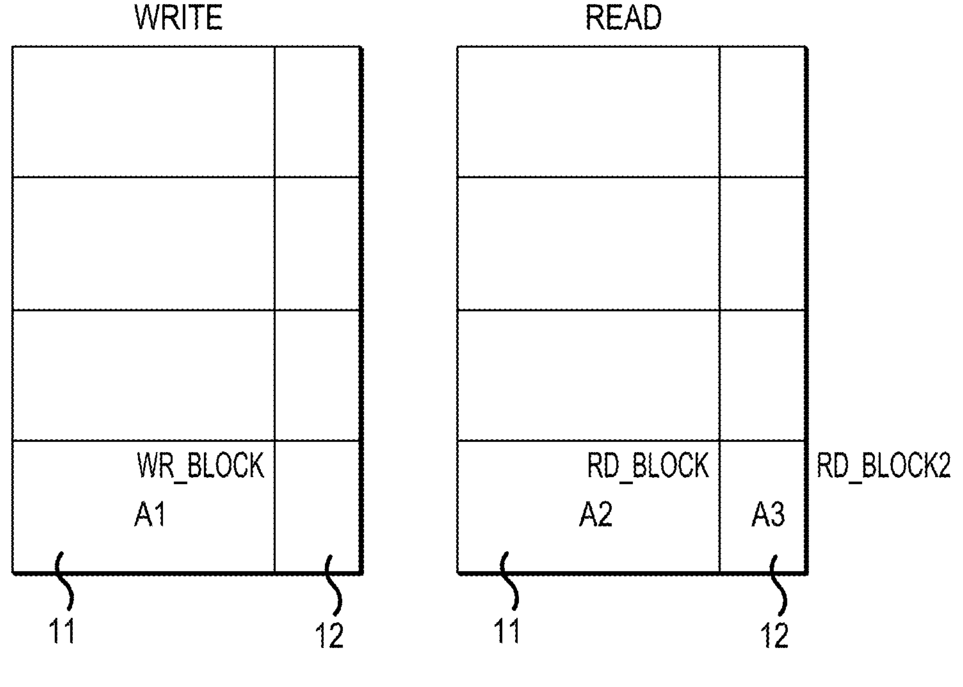
FIG. 8 shows a scenario for command blocking in the command buffer in accordance with an embodiment of the present invention.

Command blocking is a mechanism implemented to ensure data consistency when a write block operation is followed by a read operation to the same memory address. FIG. 8 depict the mechanism of the command blocking in the command buffer (100). When a write command is loaded into the command buffer (100), a "write block" (WR_BLOCK) flag is set. If a subsequent read command to the same address (identified by matching row and bank addresses) is encountered, the read command is blocked from being loaded into the command buffer (100). This prevents the read operation from accessing potentially outdated data before the write operation is completed. If a read command can be shared within an existing entry (10), it may be allowed to load, even if a write block is active. In such cases, a separate "read block" flag (RD_BLOCK) is typically set for the main command, and an additional flag (RD_BLOCK2) may be set for the shared read command.

In some cases, the clearing mechanism for the RD_BLOCK2 flag may be incomplete. This can lead to a situation where read commands remain indefinitely blocked, even after the write operation has completed and the WR_BLOCK flag has been cleared.

To overcome this, the system modifies the clearing logic for RD_BLOCK2 to ensure that it is properly deactivated once all WR_BLOCK flags have been cleared. Another solution is eliminating the RD_BLOCK2 flag altogether. Since the main command's RD_BLOCK flag effectively controls read access for the entire entry, a separate flag for shared read commands may be redundant.

Accordingly, the present invention features a command buffer (100) for a memory controller that employs a sharing mechanism to enhance memory access efficiency. This mechanism enables multiple sequential commands targeting the same DRAM page to be stored within a single command buffer entry (10), effectively increasing the command buffer's depth without significantly increasing hardware resources. The invention utilizes a dual-pointer system, comprising a load pointer (20) for tracking available slots within the shared command fields (12) and a pop pointer (30) for managing the order of command execution. Furthermore, the invention incorporates strategies to handle special cases such as write merging and command blocking, ensuring data consistency and optimizing overall performance.

The present invention addresses the limitations of conventional memory controllers, which often suffer from inefficient command scheduling and increased latency due to limited command buffer depth. Unlike conventional approaches that rely on increasing the number of physical entries in the command buffer to accommodate more commands, the present invention introduces a novel command buffer sharing mechanism. This mechanism allows multiple sequential commands targeting the same DRAM page to be stored within a single command buffer entry, effectively increasing the command buffer's depth without significantly increasing hardware resources Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A command buffer for a memory controller, comprising:
- a plurality of entries for storing a plurality of commands sequentially, each entry of the plurality of entries comprises:
  - a main command field,
  - a plurality of shared command fields,
  - wherein the main command field and the plurality of shared command fields of each entry are configured to store the commands targeting a same page, defined as having a same row and bank addresses and differing only in a least significant bits of a column address;
- a load pointer configured to indicate a next available shared command field for loading a new command targeting the same page; and
- a pop pointer configured to indicate a next shared command field in which the command is to be moved to the main command field after the command is removed.

2. The command buffer of claim 1, wherein each entry of the plurality of entries further comprises a validity bit for indicating validity of the commands in the entry.

3. The command buffer of claim 1, wherein each entry is configured to store two or four commands.

4. The command buffer of claim 1, wherein the load pointer is incremented by 1 when a new command is stored in the shared command field of the entry.

5. The command buffer of claim 1, wherein the pop pointer is incremented by 1 when the command in the main command field is removed.

6. The command buffer of claim 1, wherein the load pointer and the pop pointer are configured to indicate a first slot of the shared command fields when the command targeting a new page is loaded into the main command field, or all the commands in shared command fields are removed.

7. A method of operating a memory controller comprising:

receiving a plurality of commands in a plurality of entries of a command buffer, each entry plurality of entries comprises:

a main command field, a plurality of shared command fields, a load pointer indicating a next available shared command field for loading a new command targeting a same page, and a pop pointer configured to indicate a next shared command field in which the command is to be moved to the main command field;

identifying commands targeting a same page as the command in the main command field, defined as having a same row and bank addresses and differing only in a least significant bits of a column address;

loading the identified commands targeting the same page into the shared command fields according to the load pointer;

incrementing the load pointer by 1, upon loading the shared command field to indicate a subsequent shared command field for loading the command;

removing the command which has been processed from the main command field;

moving the command from the shared command field as indicated by the pop pointer into the main command field; and incrementing the pop pointer by 1, upon moving the command from the shared command field to indicate subsequent shared command field for moving the command into the main command field.

8. The method of claim 7, wherein merging the commands into a single command is disallowed for entries containing shared commands.

9. The method of claim 7, further comprising:

a mechanism for blocking read commands from loading into the main command field when a write command to the same address, defined as having the same row and bank addresses, is pending in the main command field.

10. The method of claim 9, wherein said blocking mechanism is deactivated when all write commands to said address, defined as having the same row and bank addresses, have been processed and removed from the main command field.

* * * * *